XR 3,999,180 104N SEARCH ROOM

United Stat... [19]

SUBSTITUTE FOR MISSING XR

Hickman

[11] 3,999,180
[45] Dec. 21, 1976

[54] MULTIPLEX DRIVER SYSTEM FOR LIQUID CRYSTAL DISPLAY

[75] Inventor: Gordon W. Hickman, Placentia, Calif.

[73] Assignee: Rockwell International Corporation, El Segundo, Calif.

[22] Filed: June 9, 1972

[21] Appl. No.: 261,207

Related U.S. Application Data

[63] Continuation-in-part of Ser. No. 188,686, Oct. 4, 1971, abandoned.

[52] U.S. Cl. .......................... 340/336; 340/324 R; 350/160 LC

[51] Int. Cl.[2] ...................... G02F 1/13; G08B 5/36

[58] Field of Search ........................ 340/324 R, 336

[56] References Cited

UNITED STATES PATENTS

| | | | |
|---|---|---|---|
| 3,505,804 | 4/1970 | Hofstein | 340/324 R X |
| 3,575,492 | 4/1971 | Nester et al. | 350/16 DL |
| 3,653,745 | 4/1972 | Mao | 350/160 LC |
| 3,668,689 | 6/1972 | Drage | 340/336 X |
| 3,674,341 | 7/1972 | Hedman et al. | 350/160 LC |
| 3,698,012 | 10/1972 | Ensminger et al. | 340/324 R |
| 3,715,881 | 2/1973 | Girard | 58/50 R |
| 3,723,749 | 3/1973 | Shapiro | 307/38 |
| 3,750,383 | 8/1973 | Kakizawa | 58/50 R |

*Primary Examiner*—David L. Trafton
*Attorney, Agent, or Firm*—H. Fredrick Hamann; G. Donald Weber, Jr.

[57] ABSTRACT

Corresponding segments of each display character are connected to common drive voltage conductors to which are applied pulsed DC drive voltages of predetermined polarities and pulse widths in response to segment logic inputs. Base conductors on the opposite plate of the display for each display position are connected to individual conductors to which are applied pulsed DC drive voltages of predetermined polarities and pulse widths in response to a character logic input. The drive voltages on the base conductors and on the conductor segments corresponding to selected input characters are opposite in polarity and have approximately the same pulse width. Drive voltages on other (i.e. unselected) base conductors and conductor segments have the same polarities. The drive voltages are synchronized.

11 Claims, 7 Drawing Figures

INVENTOR
GORDON W. HICKMAN
BY
Robert G. Rogers
ATTORNEY

INVENTOR
GORDON W. HICKMAN
BY Robert G. Rogers
ATTORNEY

INVENTOR
GORDON W. HICKMAN
BY
Robert G. Rogers
ATTORNEY

INVENTOR
GORDON W. HICKMAN
BY Robert G. Rogers
ATTORNEY

MULTIPLEX DRIVER SYSTEM FOR LIQUID CRYSTAL DISPLAY

CROSS-REFERENCE TO RELATED APPLICATION

This application is a continuation-in-part of the application entitled Multiplex Driver System for Liquid Crystal Display by Gordon W. Hickman, filed on Oct. 4, 1971 bearing Ser. No. 188,686, now abandoned.

BACKGROUND OF THE INVENTION

Field of the Invention

The invention relates to a multiplex drive system for a liquid crystal display and more particularly to such a drive system in which pulsed and synchronized DC voltages are applied to corresponding segments and to base conductors of display characters for producing an input character display while inhibiting non-input displays.

A liquid crystal display in one form may comprise two parallel plates separated by a sufficient distance to accomodate a layer of liquid crystal material. The parallel plates may be coated with transparent conductors comprised of, for example, tin oxide, on the inside surfaces of the plates. Liquid crystal materials are classified according to the arrangement of their molecules into three categories, namely, nematic, cholesteric, and smectic.

Liquid crystals are normally quiescent and essentially transparent in the absence of drive voltages. Whenever drive voltages of sufficient amplitude and duration are applied to conductors on both sides of the material, the electric field created between the conductors alters the molecular arrangement of the liquid crystal materials altered. As a result, light passing through the opague liquid crystal material is forward scattered to form a contrast with the liquid crystal material which remains quiescent. When the drive voltages are removed, the material returns to its original transparent condition after a finite period of time. If the drive voltages are reapplied within the finite period, the display continues without interruption. Generally cyclical drive voltages are used for that purpose.

Liquid crystal displays may be transmissive or reflective. A transmissive display, as shown in FIG. 1, forward scatters light passing from the back plate through the transparent front plate. A reflective display as shown in FIG. 2, forward scatters light as it passes through the front plate to the back plate. The light is reflected from a back plate mirror.

In one type of display, each segment of a character is driven by an individual drive voltage. Thus a liquid crystal display with eight positions for displaying a digit (character) at each position having 7 segments per digit, requires 56 conductors for 56 drive voltages applied to individual segments, and 1 conductor for the drive voltage applied to base conductors. Base conductors usually have a configuration which is approximately coextensive with the circumferential configuration of the combination of character segments. A back single conductor is provided for each combination of segments at a display position.

AC signals have been used as drive voltages to avoid non-reversing DC current flow between front and back conductors. Continuous currents through the liquid crystal material separating the conductors may cause a degradation of the performance of the material. However, the use of AC signals requires somewhat complex circuitry. In addition, because of the relatively high peak to peak voltages, additional restrictions are placed on the AC drive circuitry.

It would be preferred if drive voltages could be supplied by reversing DC voltage levels. In that case, standard digital logic circuitry could be used to produce a drive voltage without the necessity for complex circuitry. However, precautions must be taken to prevent prolonged DC current from passing through the liquid crystal material. The present invention provides such a liquid crystal drive system display that avoids the DC current problem.

SUMMARY OF THE INVENTION

Briefly, the invention comprises a liquid crystal drive system using multiplexed drive circuitry for segments of the display characters. Corresponding segments on one plate of the display are connected to common conductors in a multiplexed arrangement to which are applied pulsed and synchronized DC drive voltages of predetermined polarities and pulse widths in response to a desired character input signal. Base conductors on the opposite plate of the display are connected to individual conductors to which are applied pulsed DC drive voltages of predetermined polarities and pulse widths in response to the character selection input signal.

Drive voltages on the base conductors and conductor segments of the selected input characters (at each display position) have opposite polarities and approximately the same pulse widths. Thus, an electric field is produced between the conductors and through the liquid crystal material. The pulse widths are selected as a function of the particular liquid crystal material between the plates.

The drive voltages on other (unselected) conductor segments and base conductors have the same polarities so that the electric fields between the other segments and base conductors are insufficient to alter the molecular arrangement of the liquid crystal material. As a result, only the liquid crystal material between the selected segments and base conductors to which are applied opposite polarity drive voltages becomes opaque to light. Light through the opaque regions of the liquid crystal material is forward scattered for providing a contrast with the light passing through the liquid crystal material which remains transparent. The input character is displayed at a particular display position by viewing the forward scattered light in contrast with the non-forward scattered light.

In addition, the drive voltages of either one or both of the segment drive voltage signals or the back conductor drive voltage signals are pulsed at a relatively faster rate (pulse widths insufficient to cause forward scattering) between the periods when a drive voltage is applied (or reapplied) to generate a display of an input character. As a result, a better light contrast is produced for the selected (input) character.

Polarities of the drive voltage signals on both the segments and base conductors are periodically reversed for preventing prolonged DC currents from flowing between the conductors on both faces of the display. The reversal may occur immediately following the pulse corresponding to an input character or after an intervening period of time. The drive voltages are applied to the segment and base conductors cyclically so that character displays of previously selected input characteristics are maintained until all the characters have been input.

The pulse width and phase relationship of the off signals are adjusted so that the arithmetic sum of the signals on the front (sector) and back (digit) conductors produces a pulse train having a ⅓ duty cycle which has insufficient energy to cause unwanted illumination (dynamic scattering) of the liquid crystal material. By ⅓ duty cycle is meant the pulse is present one part of a cycle and absent two parts of a cycle. All combinations of signals on front and back conductors when commanding an off mode in the crystal produce a pulse train with a ⅓ duty cycle.

Therefore it is an object of this invention to provide a multiplex drive system for a liquid crystal display in which the number of conductors required to implement the display are reduced.

It is another object of this invention to provide a DC drive voltage system for a liquid crystal display in which the DC signals are periodically reversed to prevent non-reversing DC current from passing between conductors through the liquid crystal material.

Still another object of this invention is to provide a multiplexed driver system for a liquid crystal display using pulsed and synchronized DC drive voltages in which the frequency of the pulse width varies as a function of an input character for a particular display position.

Another object of this invention is to provide a multiplex driver system for a liquid crystal display which does not require alternating current (AC) drive voltages and alternating current circuitry for processing the drive voltages to the conductors of the display.

A still further object of this invention is to provide a multiplexing process for driving liquid crystal cells in which the polarities and pulse widths of the drive voltages applied to conductors on the front and back plates of the liquid crystal display are controlled for providing an improved liquid crystal display system.

Another object of this invention is to provide a multiplex drive system in which the pulse widths, phase and duty cycle of the on and off signals are selected relative to each other for suppressing unwanted dynamic scattering and maximizing wanted dynamic scattering.

DESCRIPTION OF THE PREFERRED EMBODIMENTS

Figure 1:
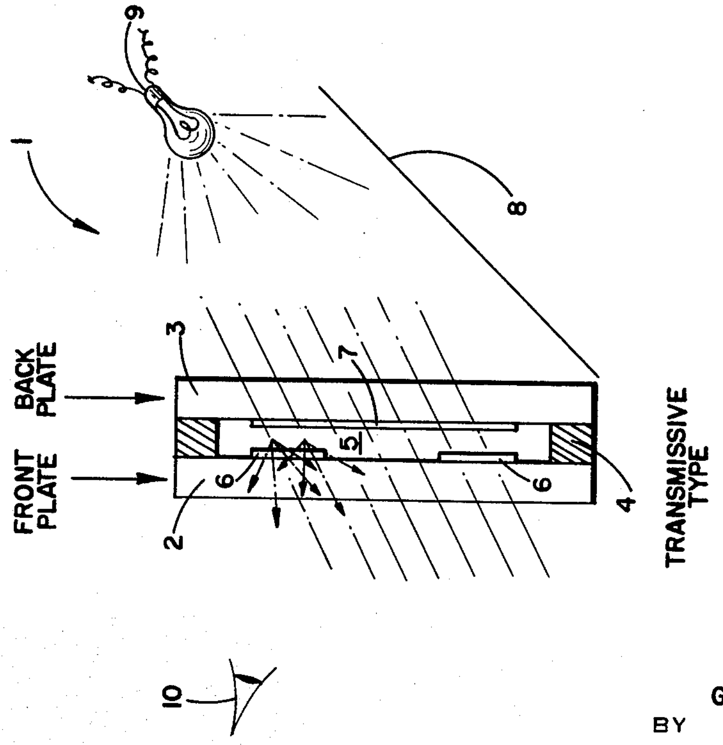
FIG. 1 is a cross-sectional view of a transmissive type of liquid display system.

FIG. 1 is a cross-sectional view of a transmissive liquid crystal display 1 comprising front plate 2 and back plate 3 separated by spacing layer 4 forming an enclosed cavity for liquid crystal material 5 between the front and back plates. Conductor segments identified generally by the numeral 6 are formed on the inner surface of the front plate 2 and back conductors identified generally by the numeral 7 are formed on the inner surface of the back plate. Nonreflective black surface 8 is disposed behind the back plate. Light source 9 provides the light for the display. A viewer of the display is identified generally by numeral 10.

Figure 2:
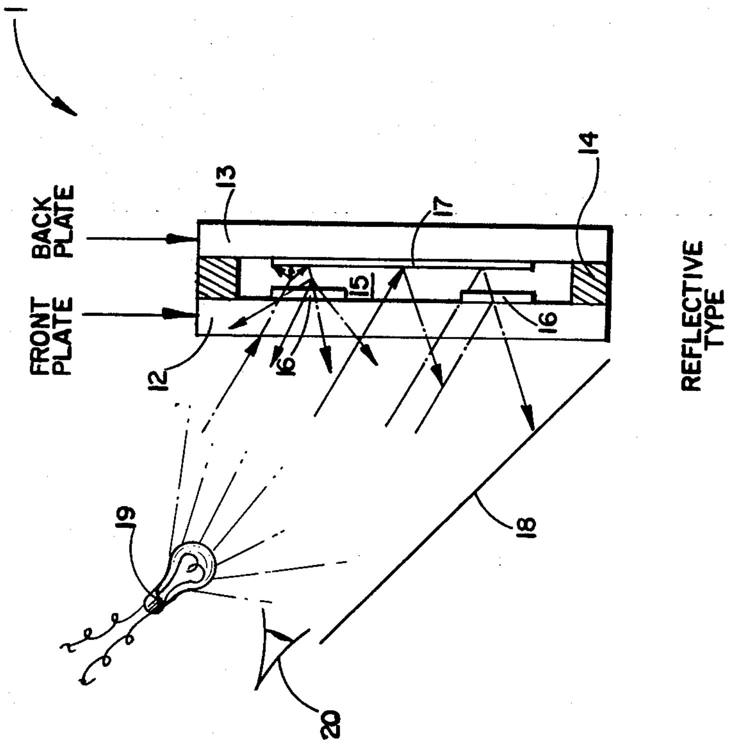
FIG. 2 is a cross-sectional view of a reflective type of liquid crystal display.

FIG. 2 is a cross-sectional view of a reflective type of liquid crystal display 11 comprising front and back plates 12 and 13, respectively, separated by a spacing layer 14 forming an enclosed cavity for liquid crystal material 15. Conductor segments identified generally by the numeral 16 are formed on the inner surface of front plate 12 and back conductors identified generally by the numeral 17 are formed on the inner surface of the back plate 13. Nonreflecting black surface 18 is shown disposed in front of the front plate. The light is supplied from light source 19 and a viewer is identified generally by the numeral 20.

Although various types of liquid crystals may be utilized in forming the liquid crystal display, nematic liquid crystals have generally been used. Nematic liquid crystals have a parallel molecular arrangement in which the molecules can rotate around their own axes, move laterally or in parallel with their axes. Specific examples of nematic liquid crystals are believed known to persons skilled in the art. For that reason, liquid crystals are not described in detail herein.

The front and back plates of the liquid crystal displays are generally parallel and are separated by a nonconductive spacer. The exact degree of separation depends upon the particular liquid crystal material, and voltage levels being used. The separation may be anywhere from five to seventy-five microns. Voltages may range from ten to eighty volts. The conductors may be comprised of a transparent tin oxide material.

In operation, when no drive voltages are applied to the conductors, light from a light source passes through the liquid crystal material without being scattered. Therefore, a viewer is unable to visualize a display. However, when drive voltages are applied to the conductors of such a magnitude and duration as to create an electric field between the conductor segments and the back conductors, the molecules of the liquid crystal material are rearranged. As a result, light passing through the liquid crystal material is forward scattered. In other words, a liquid crystal material between the energized conductor segments and the energized back conductor, becomes opaque. A distinct contrast between light from the forward scattered areas and light from the transparent areas can be seen. Light from the forward scattered areas appears relatively brighter than light from the transparent areas so that a character display of the brighter light is seen by the viewer.

A liquid crystal display generally comprises a plurality of display positions. For example, a display may consist of eight display positions, or digits. Each position is capable of displaying a numeral from zero to nine. Therefore, the conductors on the front plate for each display position are divided into seven segments. The seven segments (numbered 1–7) are rectangular in appearance with one segment 4 dividing the rectangle into two equal boxes. It should be understood, however, that the general configuration may vary as a function of the requirements of a particular application.

A back conductor is usually an unbroken conductor subjacent the conductor segments on the front plate and having generally the same outer dimensions of the segmented conductors on the front plate. Drive voltage conductors are connected to each of the segments and to the conductors on the back plate as described subsequently.

Figure 3:
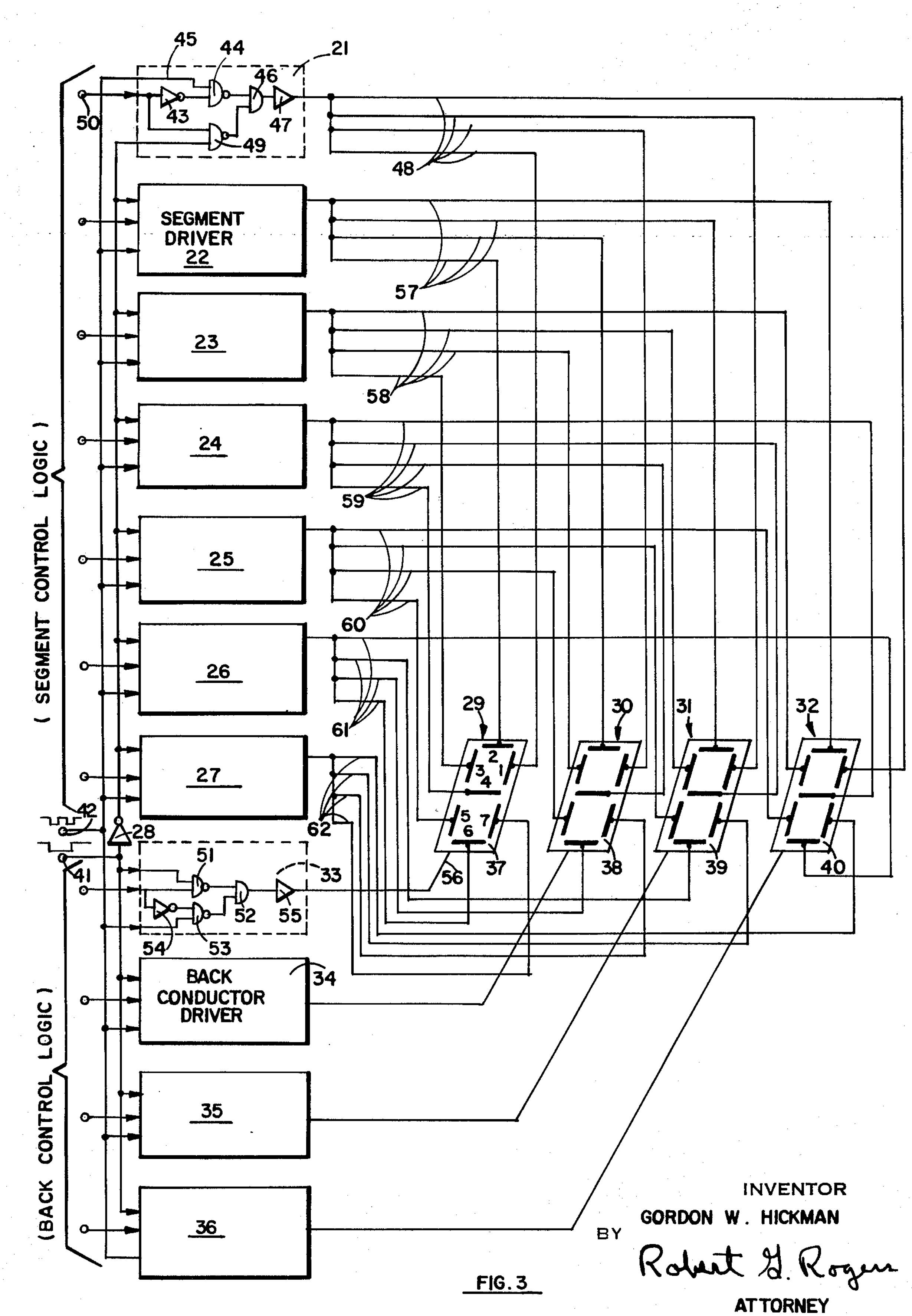
FIG. 3 is a partial block, partial logic diagram of a multiplexed liquid crystal display system.

FIG. 3 is a partial block, partial logic diagram of one embodiment of a circuit for providing pulsed DC drive voltages to the drive conductors connected to conductor segments and to back conductors of the liquid crystal display. For simplification, the conductor segments and back conductors for each position of the liquid crystal display are illustrated in schematic form. FIGS. 1 and 2 can be referred to for more details. In addition, the liquid crystal display is represented as having four display positions. In other embodiments, a different number of display positions may be used.

As shown in FIG. 3, segment drive circuits 21 through 27 provide drive voltages to segments 1 through 7 of each display position. The segments are numbered at the first display position 29. The display positions are identified by the numerals 29, 30, 31, and 32. Conductors forming segment 1 at each display position are connected together at the output of segment drive circuit 21. In other words, the conductors are multiplexed. Similarly, the drive voltage conductors for segments 2 through 7 are connected together (multiplexed) at the outputs of segment drive circuits 22 through 27.

As a result of multiplexing the drive conductor segments, a substantial number of drive voltage conductors and associated logic for generating the drive voltages can be eliminated or simplified.

Back conductor drive circuits 33, 34, 35, and 36 are illustrated for providing drive voltages to the back conductors 37, 38, 39, and 40 for display positions 29 through 32 respectively. Specific examples of circuits 21 and 33 only are illustrated in FIG. 3. It should be understood that the related circuits 22–27, 34–36 can be similarly implemented.

Logic inverter 28 inverts the relatively low frequency signal on terminal 41 and provides the inverted signal as inputs to each of the segment drivers 21–27. The use of the low frequency signal as well as the relatively higher frequency signal on terminal 42 is described in more detail subsequently.

Circuit 21 comprises logic inverter 43 providing one input to NAND gate 44 which receives the relatively high frequency signal on line 45 as a second input. The output from NAND gate 44 provides one input to AND gate 46. The output from AND gate 46 is amplified by the driver amplifier 47 and connected to the drive conductors identified generally by numeral 48 for segment 1 at each of the display positions.

The other input to AND gate 46 is provided by NAND gate 49 which receives one input from logic inverter 28 and a second input from control logic (not shown) on line 50. The control logic may comprise, for example, part of a calculator system which responds to an input button or to a previously commanded computation. The control logic determines which numbers are diplayed at which positions. The relatively high and low frequency signals at terminals 42 and 41, respectively, comprise pulsed DC drive voltages shown specifically in FIGS. 4 and 5.

Generally when the control logic input is true, NAND gate 49 passes and inverts the low frequency signal from logic inverter 28 to AND gate 46. The output from NAND gate 44 is true for the conditions assumed so that the relatively low frequency pulsed DC drive voltage is amplified and applied to segment one at each display position.

If the control logic input is false, the output from logic inverter 43 is true and the relatively high frequency pulsed DC voltage at one input of NAND gate 44 is provided at one input to AND gate 46. Therefore AND gate 46 provides a high frequency pulsed output to amplifier 47. The high frequency pulsed output from amplifier 47 is applied to conductor segment one at each display position to inhibit a display from those segments as described subsequently.

The relatively low frequency signal from terminal 41 is also provided as one input to NAND gate 51 of circuit 33. NAND gate 51 receives a back control logic (not shown) input signal on line 75. The back control logic, as indicated above, may comprise circuitry of a calculator such as a ring counter for sequentially controlling the application of the relatively low frequency voltage to the back conductors of the liquid crystal display.

In addition, circuit 33 comprises AND gate 52 which receives an input from NAND gate 51 and an input from NAND gate 53. NAND gate 53 receives as one input, the relatively high frequency, pulsed DC drive voltage and as another input, the output from logic inverter 54. Logic inverter 54 receives an input from back control logic as described above. The output from AND gate 52 passes through driver amplifier 55 and is provided to the back conductor 37 at display position via line 56.

Generally, when the back control logic input is true, NAND gate 51 passes the low frequency signal to AND gate 52. The output from NAND gate 53 is true since the control logic signal is inverted by inverter 54 to set the output of NAND gate 53 true. Therefore, for the assumed conditions, the output from AND gate 52 is the relatively low frequency signal having an opposite polarity from the signal applied to segment 1 (see above description) and is applied to back conductor 37.

If the control signal is false, the output from NAND gate 51 is true and NAND gate 53 passes the relatively high frequency signal to AND gate 52. The high frequency signal is then passed through AND gate 52 and amplifier 55 to the back conductor 37 for inhibiting displays from that position.

As a specific example, assume that a display consisting of the numerals 2, 5, 1, 4 is being generated by the liquid crystal display. The digit 2, displayed by position 29, utilizes segments 2, 1, 4, 5 and 6. The digit 5, displayed by position 30, requires segments 2, 3, 4, 7 and 6. The digit 1, position 31, requires segments 1 and 7, and the digit 4, position 32, requires segments 3, 4, 1 and 7.

In order to display digit 2 at position 29, true drive voltages are provided on conductors 57, 48, 59, 60, and 61 for segments 2, 1, 4, 5 and 6. Drive voltages on conductors 58 and 62 for segments 3 and 7 are false. Simultaneously, since the display for position 29 is being generated first, the back drive voltage supplied to conductor 37 on conductor 56 is also true. The drive voltages on other back conductors are false. The relationship between drive voltages for each segment and each back conductor at each position can be seen by referring to FIG. 4. The drive voltages on segments 1,

2, 4, 5 and 6 are illustrated as true (one polarity) during one half of a display cycle. The drive voltage on back conductor 37 is shown as false (opposite polarity) during the first half of the display cycle. Therefore the voltage difference across the liquid crystal material causes the material to forward scatter light as previously described for generating a display of the digit 2. During the next half cycle the voltage polarities of both voltages are reversed thereby maintaining the display. As a result, the display is generated using DC voltages without producing non-inverting DC current through the liquid crystal material. It is pointed out that the pulse widths of the low frequency drive voltage are of sufficient duration to establish forward light scattering at a selected display position. The pulse widths of the high frequency drive voltages applied to segments three and seven and to back conductor 38–40 are relatively narrow and therefore insufficient to establish light scattering at the other display positions.

The digits 5, 1 and 4 displayed at the remaining positions are generated in a similar manner. As can be seen by referring to the drive voltages in FIG. 4, a display is generated when the polarities of the drive voltages applied to the conductor segments are opposite and when the drive voltages have a relatively long pulse width. In the usual case, the pulse width of the low frequency drive voltage is approximately eight times the pulse width of the high frequency voltage. The drive voltages are applied cyclically to the back conductors and conductor segments at each position for the particular digit being displayed, so that the display is continuous. In other words, even though the drive voltages are periodically switched from low frequency to high frequency, the inherent characteristics of the liquid crystal material prevent it from becoming transparent before the drive voltages (opposite polarity and extended pulse width) are reapplied.

Figure 4:
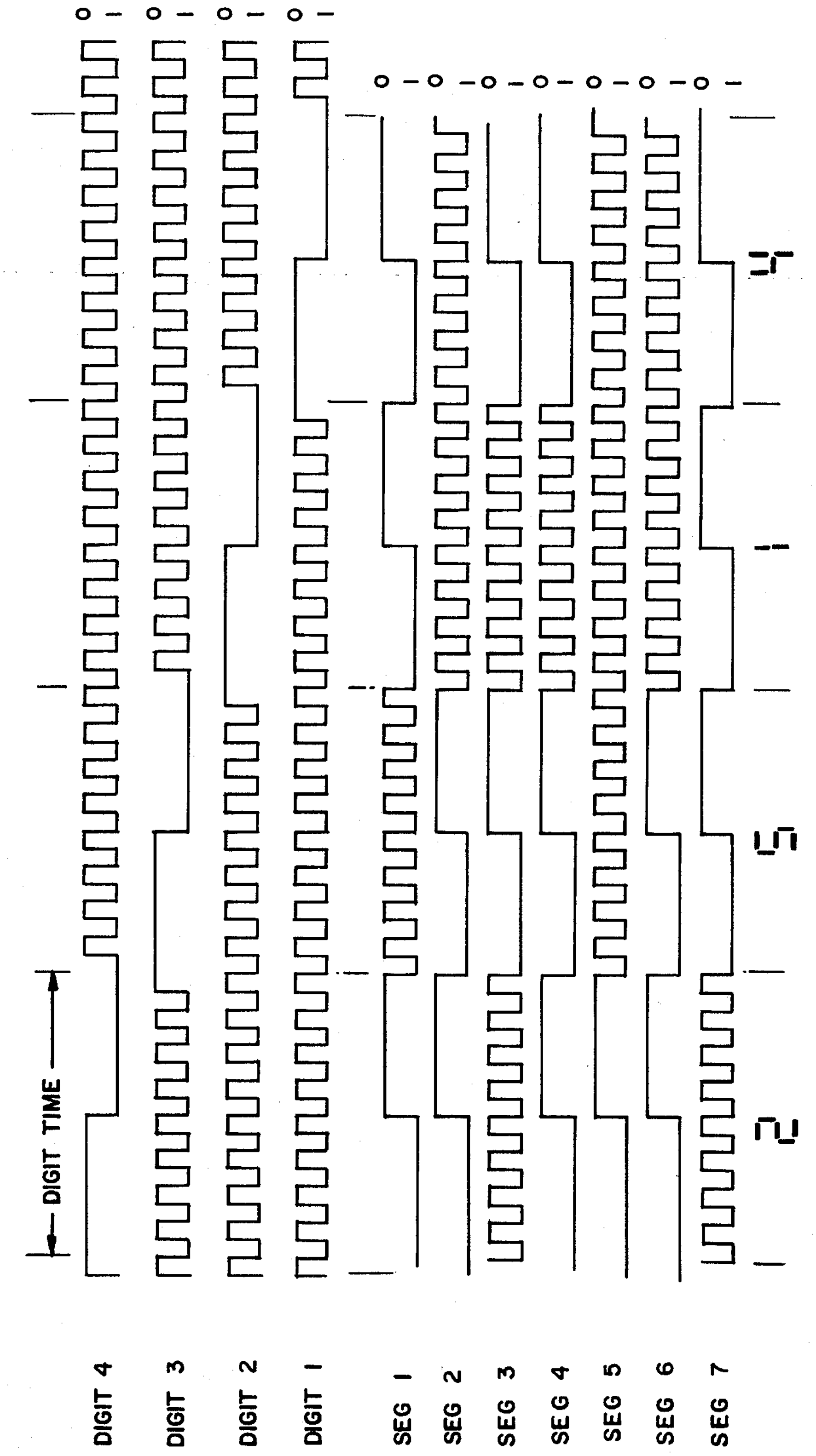
FIG. 4 is an illustration of drive voltages applied to segments of the display characters for each digit and the back conductors of each digit.
Figure 5:
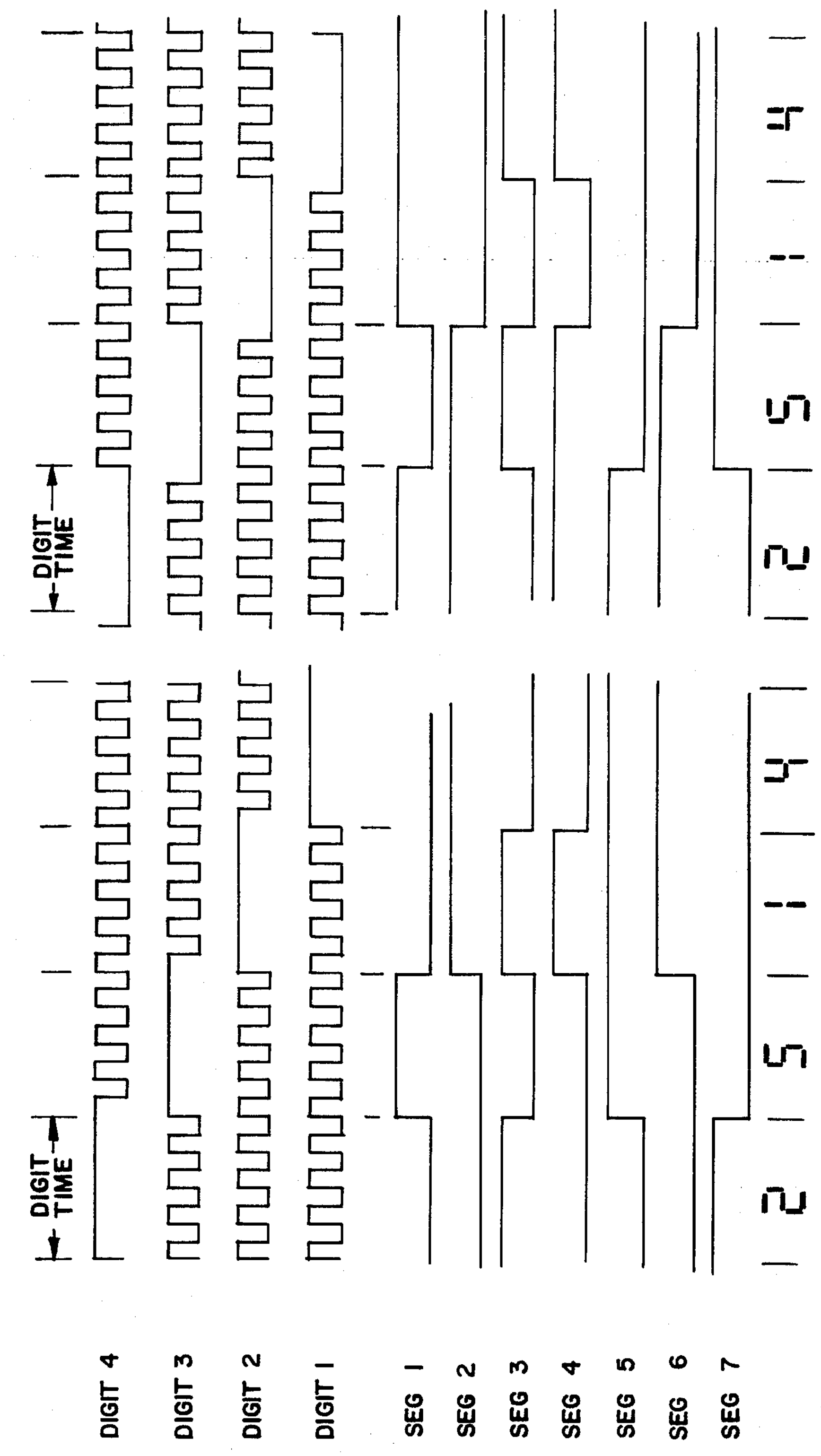
FIG. 5 is a different embodiment of drive voltages applied to the segment and base conductors of the display characters for each digit.

The drive voltages shown in FIG. 4 illustrate one arrangement of drive voltages which can be used to produce liquid crystal displays for using pulse DC drive voltages. However, FIG. 5 illustrates another example of pulsed DC drive voltages in which the reversal of polarities (low frequency) does not occur immediately but does occur cyclically. Between the reversals, the drive voltage applied to the back conductor is the relatively high frequency pulsed DC voltage shown in the figure. The drive voltages applied to the segments is not pulsed during the period when the polarities of the voltages are the same, i.e. when the liquid crystal material is not being energized. It should be understood that the drive voltages shown in FIGS. 4 and 5 are synchronized such that certain transition points e.g. true to false and false to true, occur at the same time. The synchronized relationship between the drive voltages is clearly shown in FIGS. 4 and 5.

Figure 6:
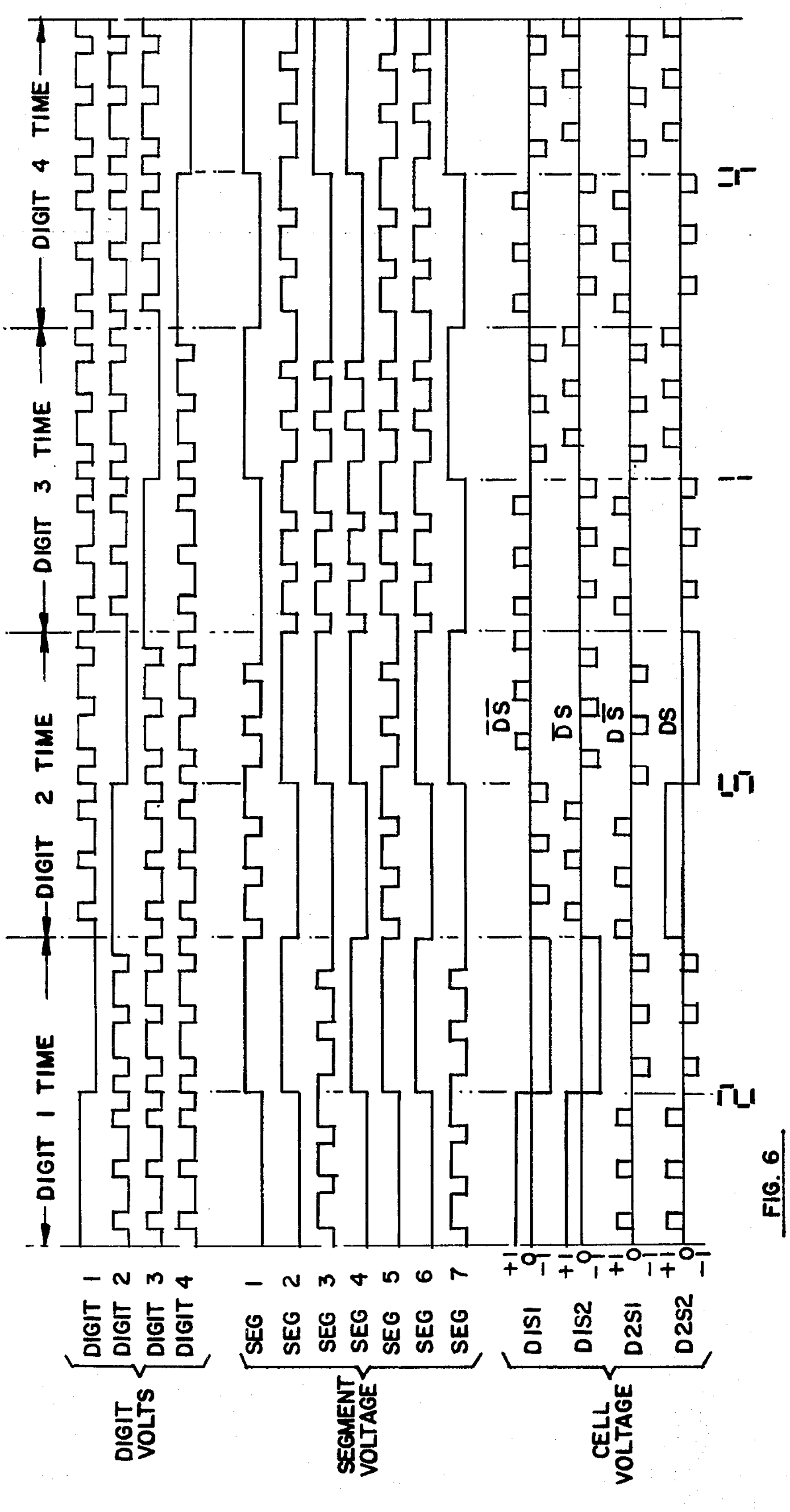
FIG. 6 is an illustration of a preferred pulse and phase relationship of on and off signals being applied to the digit and segment conductors.

FIG. 6 is a representation of a pulse phase and duty cycle relationship between on and off signals being applied to the digit and segment conductors in order to generate the display number 2514. Basically, the phase relationship between the on signal being applied to the conductors is the same as the on signals described in connection with FIGS. 4 and 5. The on signals are opposite in phase and have a corresponding pulse width.

However, the pulse relationship between the on and off signals has been changed from the relationship previously described. Previously the off signal was described as having a frequency of eight times the frequency of the on signal. In terms of energy being applied to the liquid crystal display, the off signal was out of phase (with the on signals) potentially causing dynamic scattering during one-half of the cycle. As a result, it was possible to generate unwanted dynamic scattering when the pulse width of the on signal was lengthened to turn the crystal fully on.

In order to eliminate the unwanted illumination, the relative pulse width and phase of the on and off signals shown in FIG. 6 has been changed relative to the relationship previously described. The off conditions illustrated in FIG. 6 are implemented by out-of-phase segment and digit voltage components equal to one-third of each minor cycle. In other words, the digit voltage signals and the segment voltage signals have a phase relationship such that for two-thirds of each minor cycle of the off voltage signal, the two voltage signals are inphase and at the same voltage level. For the embodiment shown, the digit and segment off voltage signals have three minor cycles for each half cycle of a digit time. Therefore, as shown by D2S1, for example, three pulses result - one for each cycle of the digit and segment voltage signals where the two signals are out of phase or opposite in voltage level. The cycles of the digit and segment signals relative to the digit time cycles are called minor cycles. For example, during the first half cycle of digit 1 time, three minor cycles of the digit 2 voltage signal occurs. Similarly, three cycles of the voltage signals occur for the off segments 3 and 7. Since the segment and digit voltage signals are out of phase during ⅓ of each of the minor cycles, the D2S1 cell voltage signal has three pulses. If the number of minor cycles of the digit voltage signal and the segment voltage signal increase, the number of pulses shown, for example, by D2S1 would also increase.

The ⅓ pulse time relative to the pulse cycle time is characteristic of all possible crystal "off" signal conditions. This resultant pulse width is time adjusted until the energy applied to the liquid display from any off command does not create illumination (dynamic scattering). The required pulse width for the on-signals required to establish full dynamic scattering is obtained by adjusting the number of minor cycles per ½ digit time as shown in FIG. 6. The number of cycles are adjusted, e.g. increased or decreased relative to the on-signals so that there is sufficient cell energy, as represented by the area of the pulses D2S1, and D2S2 in digit 1 time to cause dynamic scattering between conductors of the display which are part of the display character being generated. For example, during the cycle identified as digit 1 time, on-signals are applied to segments 1, 2, 4, 5, and 6 to illuminate the liquid crystal material corresponding to the segments used in generating a display of the digit 2. The digit 1 on-signal is out of phase with the on-signals applied to the segment conductors. As a result, a net energy is applied across the liquid crystal display between the enumerated segment conductors and the digit conductors. The applied energy component for the digit 1 segment 1 and segment 2 liquid crystal cell for digit time 1, 2, 3, and 4 is illustrated by the $D_1S_1$ and $D_1S_2$ waveforms in FIG. 6. Waveforms for $D_2S_1$ and $D_2S_2$ are also illustrated. The $D_2S_1$ waveform shows the net voltage components for both halves of the cycle corresponding to digit time 1, 2, 3 and 4. A net voltage component resulting from the out-of-phase voltages being applied across the digit 2 conductor and the segment 1 conductor is applied for one-third of each minor cycle. This voltage component is insufficient to cause illumination. The phase of the voltage component is reversed each half cycle to prevent rectified current across a display cell as previously descried in connection with FIGS. 4 and 5. This is best seen at the midportion of digit 2 time where the waveforms change phase. Other waveforms corresponding to $D_1S_3$, $D_1S_4$, $D_1S_5$, $D_1S_6$, $D_1S_7$ and other digit and segment combinations have been omitted for convenience. Although the waveforms are described in terms of energy, in effect, the waveforms illustrate the net voltage applied across the liquid crystal cell.

The pulse width relationship shown in FIG. 6 enables voltages to be applied simultaneously to corresponding segments of the liquid crystal display without causing illumination from segments other than the segments necessary to generate a required display. In other words, during digit 1 time, a segment on voltate is applied to segment 1 of each of the digits. However, because of the phase relationships between the digit 1, 2, 3, and 4 and the segment 1 voltage signal, a cell voltage which will cause illumination is present across the $D_1S_1$ cell only. $D_2S_1$, $D_3S_1$, $D_4S_1$ will experience minor cycle pulsing wherein the pulse width has been adjusted to be insufficient to cause illumination. Therefore, segment command voltages can be multiplexed in controlling multi-digit liquid crystal displays.

The illustration for the digit two time is varied slightly from the illustration for the digit one time. The logical relationship between the on and off signal pulse widths is illustrated. For example, for a digit off, segment off relationship the waveform is illustrated as $\overline{DS}$. Similarly, for a digit off, segment on signal, the waveform is $\overline{D}S$. A digit on, segment off is illustrated as $D\overline{S}$ and a digit on, segment on is illustrated as DS. In all cases except the DS case, the in-phase 2 parts out of phase 1 part relationship is maintained.

Figure 7:
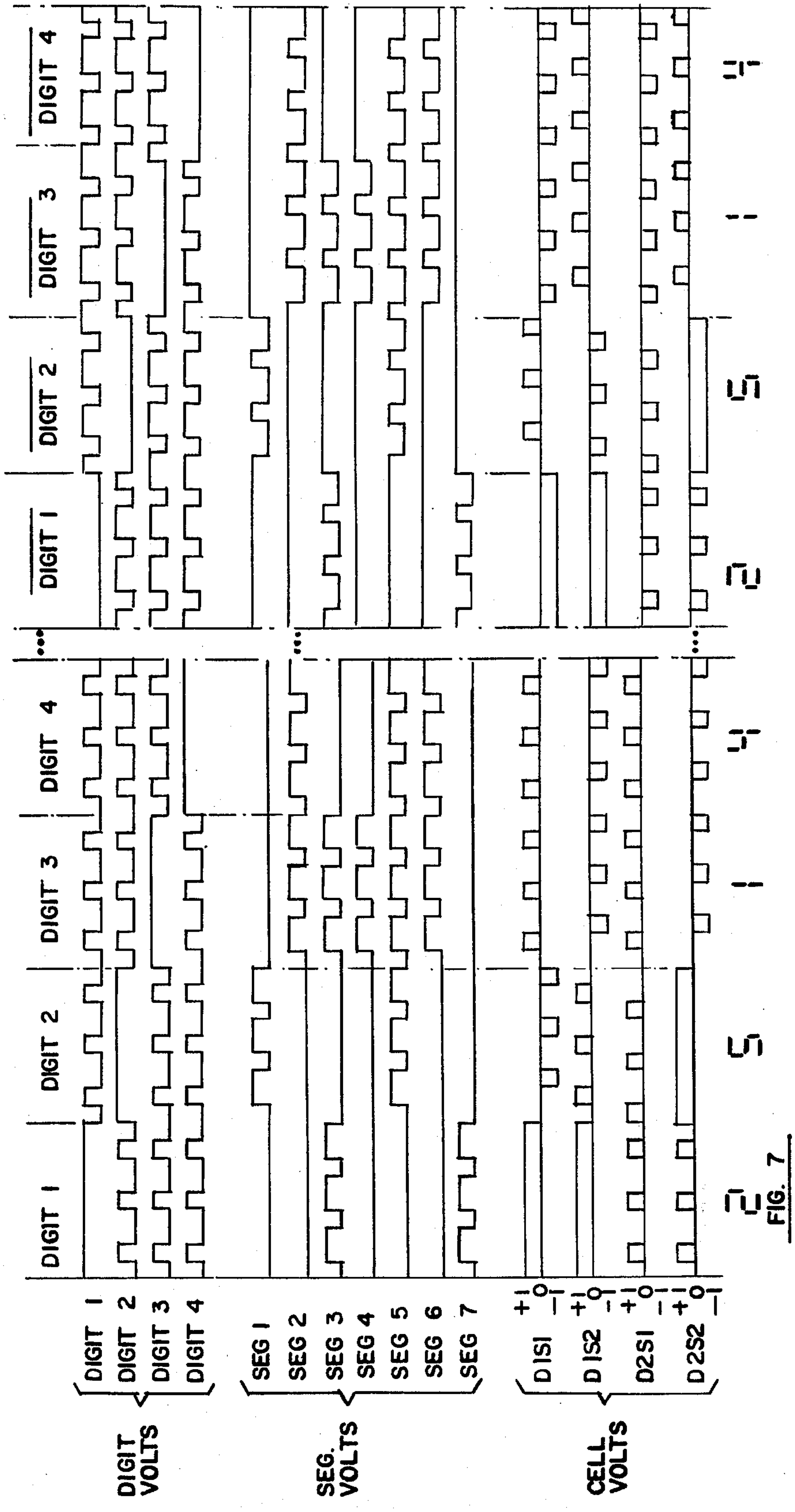
FIG. 7 is representation of a variation of the FIG. 6 signals in which the phase of the signals is reversed each alternate cycle.

FIG. 7 is substantially similar to the FIG. 6 illustration with the exception that digit one time is only one-half the interval of digit one in FIG. 6. In effect, the digit one time of FIG. 6 has been divided into two intervals — digit $\overline{1}$ and digit 1. The drive cycle is thus shortened from the drive cycle of FIG. 6.

The pulse width relationships of the on and off signals described in connection with FIG. 6 are applicable to the pulse width relationship of the FIG. 7 representation. The off voltages applied across the cell have a pulse width of one-third of the minor cycle. On-signals are 1 digit long. The number of minor cycles per digit is selectable. The logical relationship e.g. $\overline{D}S$ - DS applies equally to the FIG. 7 illustration.

I claim:

1. A multiplex driver system for a liquid crystal display, said system comprising,
   - a pair of substantially parallel plates,
   - said plates separated by a liquid crystal material that is responsive to an electric field thereacross for forward scattering light being passed therethrough,
   - a plurality of conductor segments on one plate of said liquid crystal display, said plurality of condutor segments arranged for forming display characters at each display position,
   - a plurality of conductors for supplying drive voltages to said conductor segments, individual ones of said conductors connected in a multiplexed arrangement to corresponding conductor segments of each display character at each display position,
   - a plurality of back conductors on a second plate of said liquid crystal display, said back conductors being substantially aligned with corresponding conductor segments at each display position,
   - a plurality of individual conductors for supplying drive voltages to each of said back conductors, and
   - means for providing pulsed and synchronized drive voltages with opposite polarities to said conductor segments and to said back conductors corresponding to a selected character for providing a display representing the character.

2. The multiplex system recited in claim 1 wherein said plates are separated by a liquid crystal material that is responsive to an electric field between said conductor segments and said base conductors for forward scattering light being passed therethrough whereby displays are generated by selectively applying drive voltages to said conductor segments and back conductors.

3. The multiplex system recited in claim 2 and further including means for providing pulsed and synchronized DC voltages with opposite polarities to the conductor segments and back conductors corresponding to a selected character for providing a display representing the character.

4. The multiplex system recited in claim 1 wherein said means for providing pulsed and synchronized drive voltages includes means for inverting one of said pulsed and synchronized drive voltages to said conductor segments and to said back conductors which do not correspond to a selected character whereby drive voltages of the same polarities are applied to the conductor segments and back conductors.

5. The multiplex system recited in claim 4 further including means for providing said pulsed and synchronized drive voltages at different frequencies, wherein the drive voltages on the conductor segments or the back conductors which are not required for generating a display of an input character have relatively higher frequencies than the frequencies of the pulsed drive voltages applied to the conductor segments and back conductors required for generating a display of an input character, the pulse width of said relatively higher frequency drive voltages being insufficient to cause a molecular rearrangement of the liquid crystal material between the conductor segments and the base conductors.

6. The multiplex system recited in claim 1 wherein said means for providing includes driver voltages means for periodically reversing the polarities of said pulsed drive voltages for preventing uni-polar currents from passing through said liquid crystal material.

7. The multiplex system recited in claim 6 wherein the polarities of said drive voltages are reversed immediately after generating said display.

8. The multiplex system recited in claim 6 wherein the polarities of said drive voltages are reversed during each cycle of generating a character display.

9. The multiplex system recited in claim 5 further including means for periodically reapplying said drive voltages to maintain the display until the display is reset.

10. The multiplex system recited in claim 1 further comprising means for providing on and off pulses between said conductor segments and said back conductors, the pulse widths of the on pulses being equal and opposite in phase, and equal in time to N multiples of minor off cycles, the pulse widths of the on signals relative to the off signals and off segment signals relative to off digit signals being approximately one third of a minor cycle and pulse width adjusted for suppressing unwanted illumination from each display position.

11. The multiplex driver system recited in claim 10 wherein the polarities of said on and off pulses are simulataneously reversed periodically to eliminate net D.C. current through the liquid crystal display.

* * * * *